(12) United States Patent
Pellarin et al.

(10) Patent No.: US 10,913,387 B2
(45) Date of Patent: Feb. 9, 2021

(54) LIGHTING DEVICE PROJECTING TWO VERTICALLY OFFSET MATRICES OF LIGHT PIXELS

(71) Applicant: Valeo Vision, Bobigny (FR)

(72) Inventors: Marie Pellarin, Bobigny (FR); Vanesa Sanchez, Bobigny (FR); Sebastien Roels, Bobigny (FR)

(73) Assignee: Valeo Vision, Bobigny (FR)

( * ) Notice: Subject to any disclaimer, the term of this patent is extended or adjusted under 35 U.S.C. 154(b) by 157 days.

(21) Appl. No.: 16/034,957

(22) Filed: Jul. 13, 2018

(65) Prior Publication Data
US 2019/0016251 A1    Jan. 17, 2019

(30) Foreign Application Priority Data
Jul. 13, 2017  (FR) ..................... 17 56659

(51) Int. Cl.
| | | |
|---|---|---|
| *F21V 5/08* | (2006.01) | |
| *B60Q 1/14* | (2006.01) | |
| *B60Q 1/00* | (2006.01) | |
| *F21S 41/153* | (2018.01) | |
| *F21S 41/143* | (2018.01) | |
| *F21S 41/663* | (2018.01) | |

(Continued)

(52) U.S. Cl.
CPC ......... *B60Q 1/1423* (2013.01); *B60Q 1/0041* (2013.01); *B60Q 1/085* (2013.01); *F21S 41/143* (2018.01); *F21S 41/153* (2018.01); *F21S 41/65* (2018.01); *F21S 41/663* (2018.01)

(58) Field of Classification Search
CPC .. B60Q 2300/056; F21S 41/153; F21S 41/663
See application file for complete search history.

(56) References Cited

U.S. PATENT DOCUMENTS

| | | | | |
|---|---|---|---|---|
| 9,157,593 B2 * | 10/2015 | Moser | ................. | F21S 41/141 |
| 9,494,288 B2 * | 11/2016 | Kobayashi | ........... | B60Q 1/1423 |
| 9,550,448 B2 * | 1/2017 | Tanaka | ................. | F21S 41/255 |

(Continued)

FOREIGN PATENT DOCUMENTS

| | | |
|---|---|---|
| DE | 10 2014 216 545 A1 | 2/2016 |
| EP | 2 607 165 A1 | 6/2013 |

(Continued)

OTHER PUBLICATIONS

French Preliminary Search Report dated Apr. 26, 2018 in French Application 17 56659 filed on Jul. 13, 2017 (with English Translation of Categories of Cited Documents).

*Primary Examiner* — Andrew J Coughlin
(74) *Attorney, Agent, or Firm* — Oblon, McClelland, Maier & Neustadt, L.L.P.

(57) ABSTRACT

A lighting device for a motor vehicle including a first lighting module projecting at least one first matrix of first independently activatable juxtaposed pixels, the first pixels being arranged in several vertical columns and in at least one transverse row of determined height (Dh), characterized in that it includes a second lighting module projecting a second matrix of second independently activatable juxtaposed pixels, the second pixels being arranged in at least one transverse row, the second matrix being superposed with the first matrix with a vertical offset by a vertical offset distance (P) less than the determined height (Dh) relative to the first pixels of the first matrix.

14 Claims, 5 Drawing Sheets

(51) Int. Cl.
*F21S 41/65* (2018.01)
*B60Q 1/08* (2006.01)

(56) References Cited

U.S. PATENT DOCUMENTS

| | | | | |
|---|---|---|---|---|
| 2008/0239746 A1* | 10/2008 | Wuller | ............... | F21S 41/143 |
| | | | | 362/538 |
| 2014/0009938 A1* | 1/2014 | Hossfeld | ............... | F21S 41/26 |
| | | | | 362/244 |
| 2015/0070926 A1 | 3/2015 | Stefanov et al. | | |
| 2016/0068098 A1 | 3/2016 | Albou et al. | | |
| 2016/0069528 A1* | 3/2016 | Albou | ................ | B60Q 1/143 |
| | | | | 362/516 |
| 2016/0146419 A1* | 5/2016 | Reinprecht | ........ | F21S 41/153 |
| | | | | 362/512 |
| 2017/0307166 A1 | 10/2017 | Courcier et al. | | |
| 2018/0010755 A1* | 1/2018 | Park | ................. | F21S 41/147 |

FOREIGN PATENT DOCUMENTS

| | | | |
|---|---|---|---|
| FR | 3 038 694 | A1 | 1/2017 |
| WO | WO 2013/182573 | A1 | 12/2013 |
| WO | WO 2014/191528 | A1 | 12/2014 |
| WO | WO 2016/050983 | A1 | 4/2016 |

\* cited by examiner

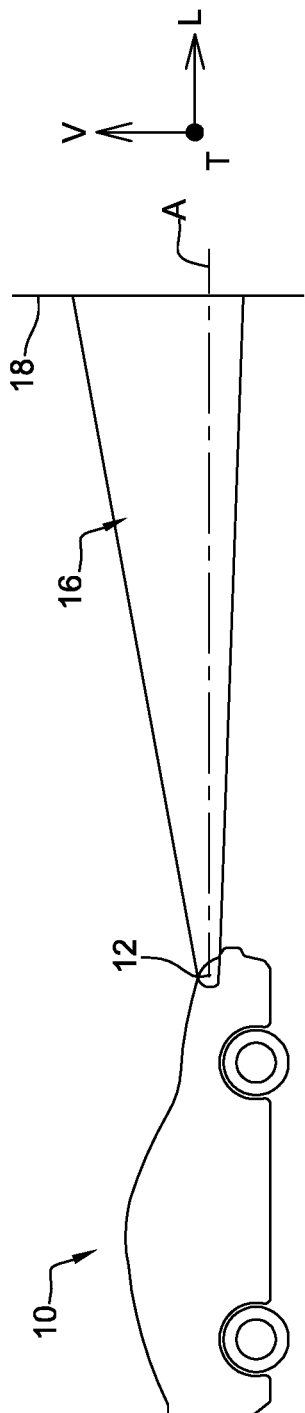
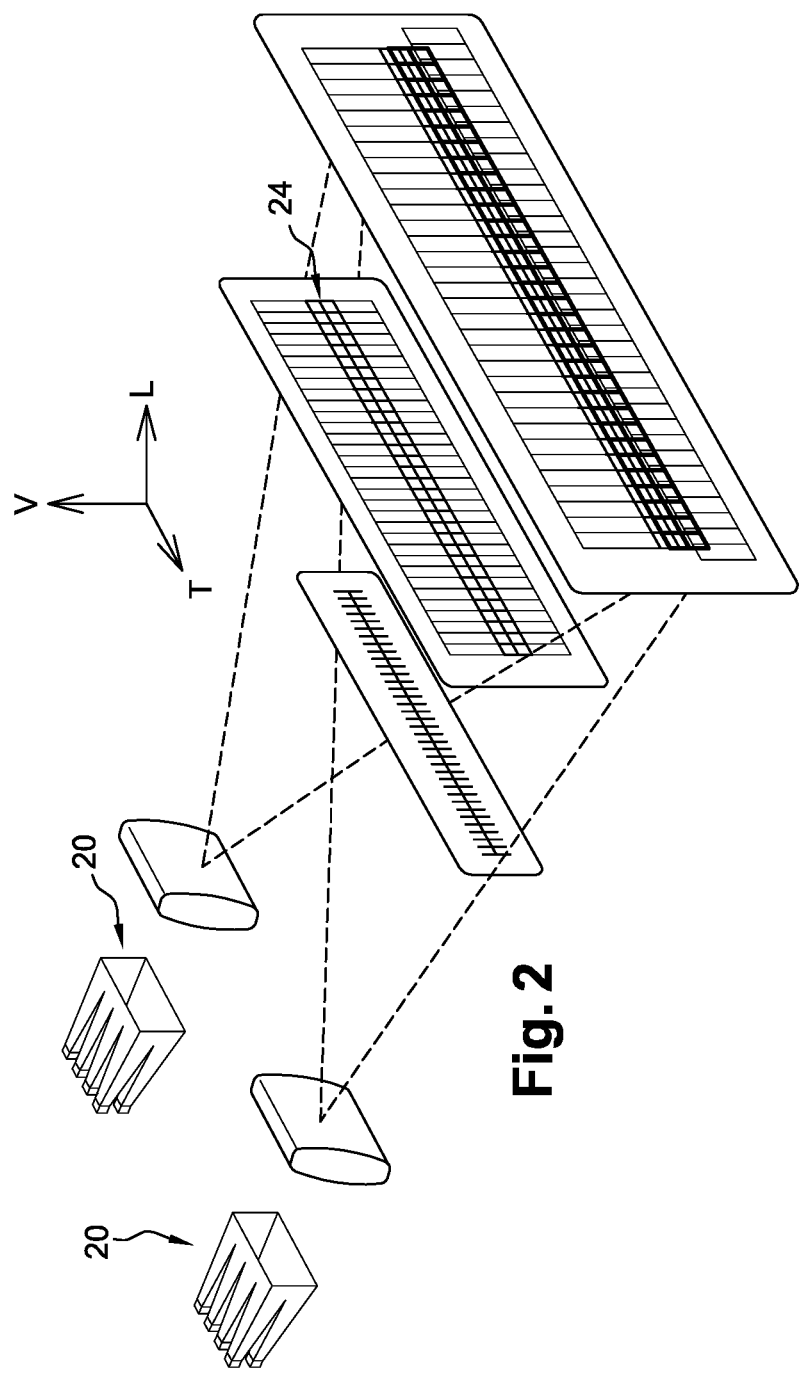

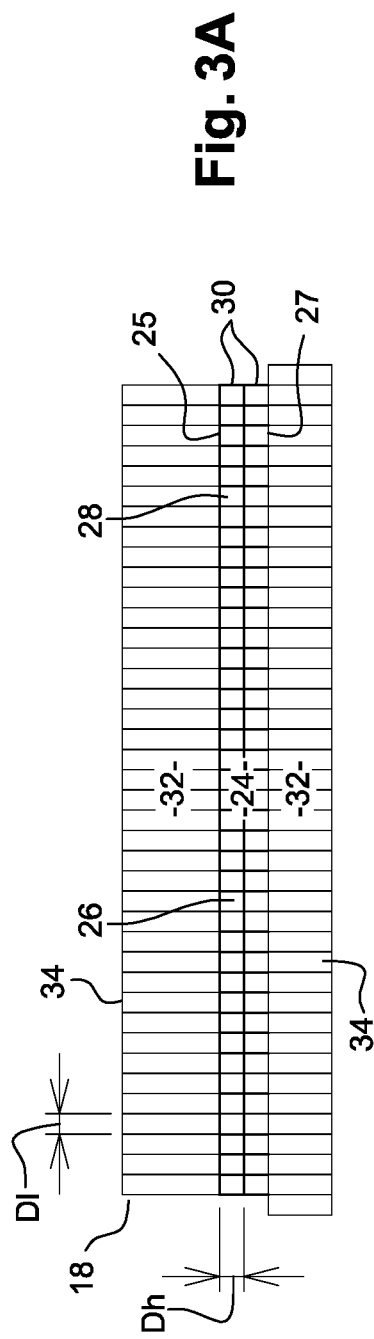
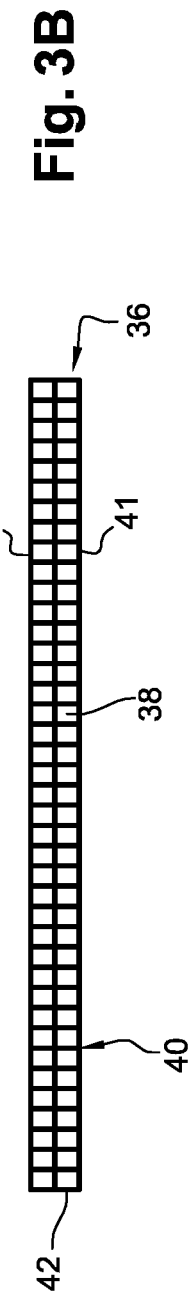
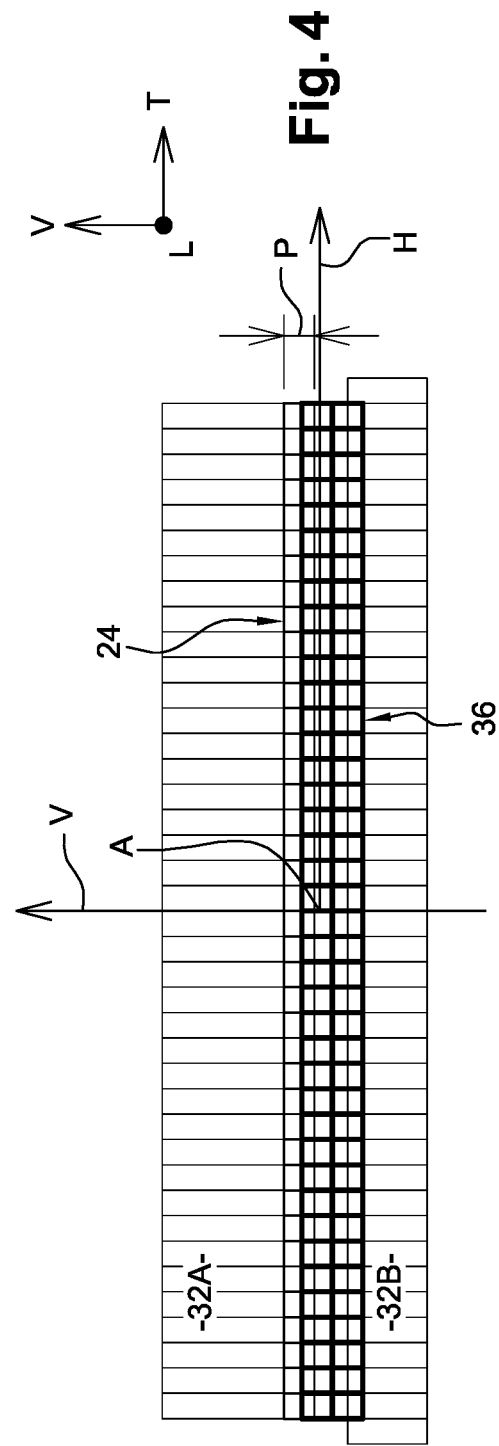

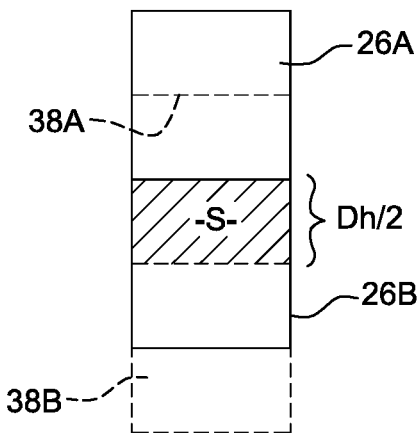 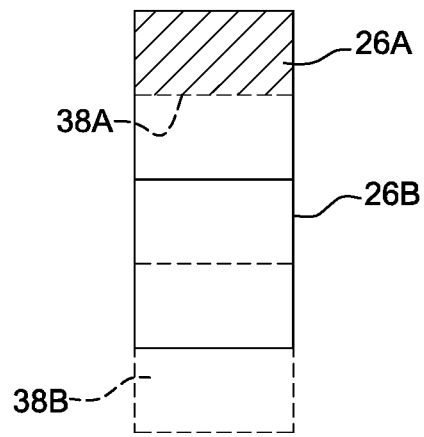
Fig. 5  Fig. 6
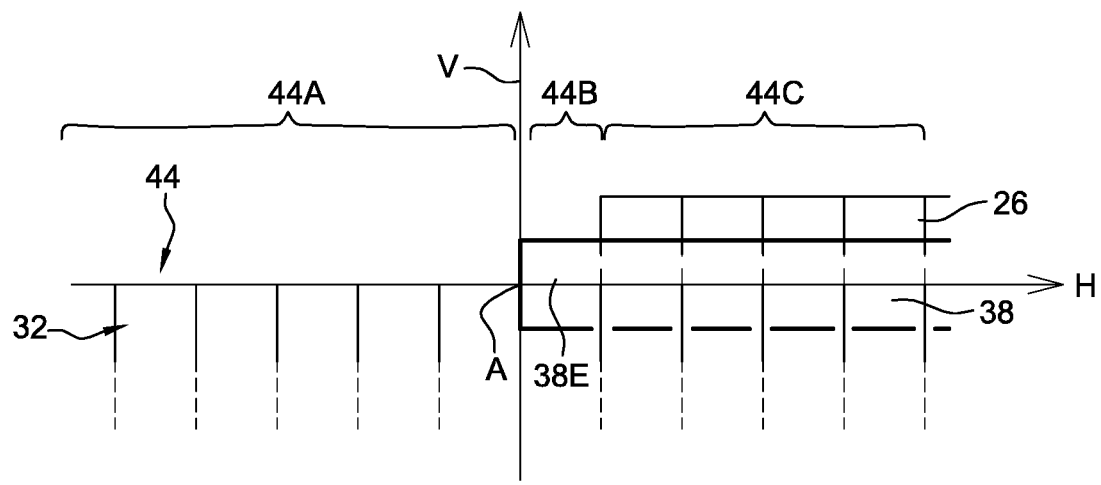
Fig. 7

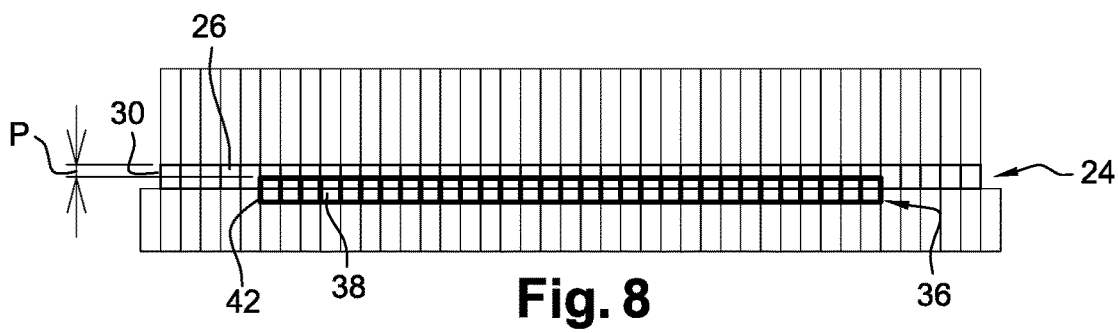
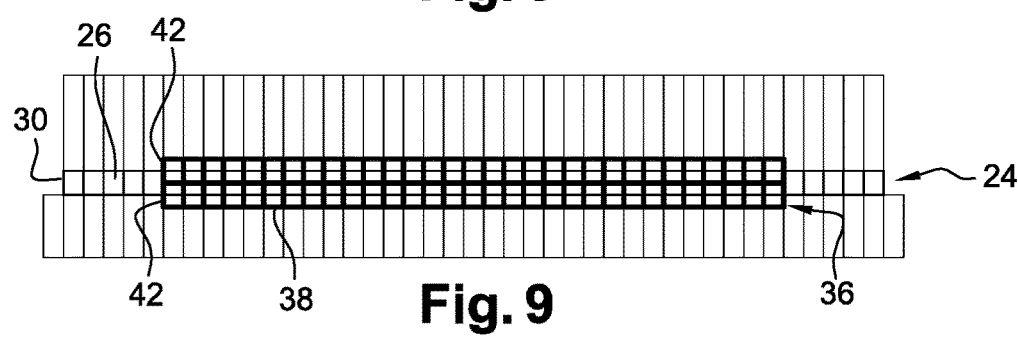
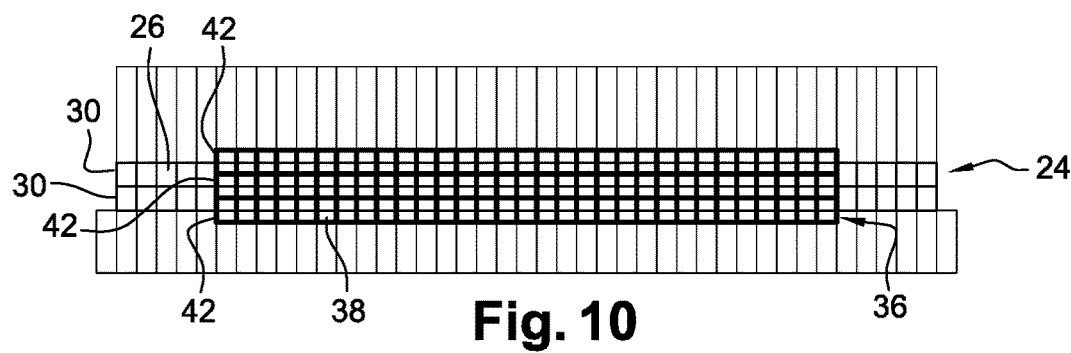
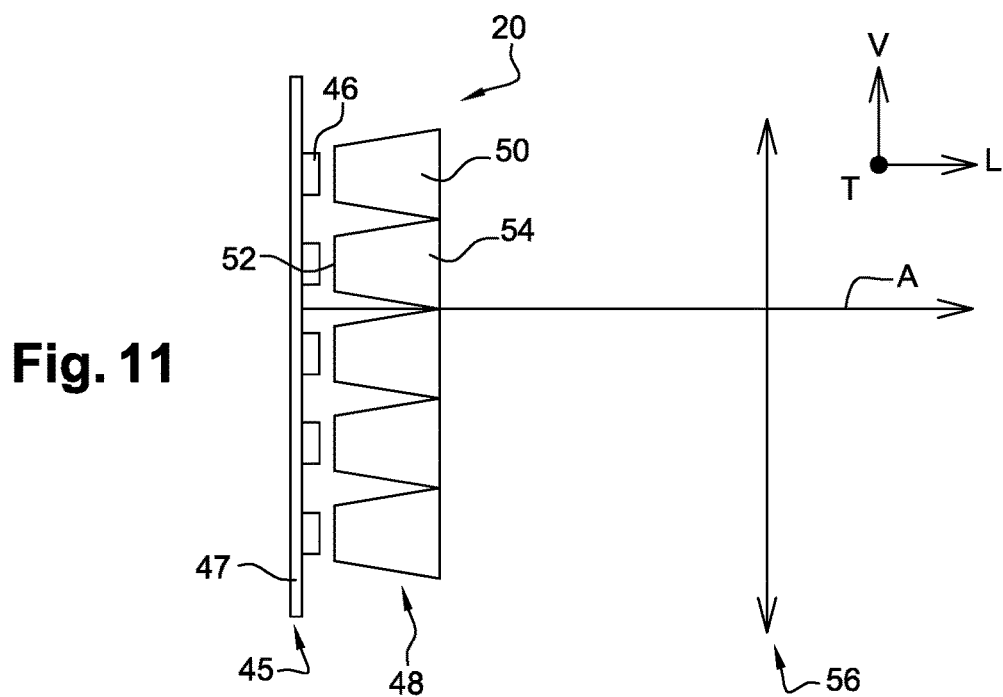

LIGHTING DEVICE PROJECTING TWO VERTICALLY OFFSET MATRICES OF LIGHT PIXELS

TECHNICAL FIELD OF THE INVENTION

The invention relates to a lighting device for a motor vehicle comprising at least one first optical module projecting a matrix of juxtaposed light pixels.

TECHNICAL BACKGROUND OF THE INVENTION

Lighting devices of this type are already known. They are capable of emitting a final segmented light beam longitudinally forwards. The lighting device comprises a matrix of elementary light sources which is projected forward to form a final forward light beam having a matrix of light pixels. By selectively switching on or switching off each of the elementary sources, the corresponding light pixel is switched on or switched off. It is thus possible to create a final light beam specifically lighting certain zones of the road in front of the vehicle, while leaving other zones in the dark.

Such a lighting device is used in particular in front lighting devices to produce an adaptive lighting function also called "ADB", the acronym for "Adaptive Driving Beam". Such an ADB function is intended to make it possible to automatically detect a user of the road likely to be dazzled by a light beam emitted in high beam mode by a headlight, and to modify the outline of this lighting beam so as to create a shadow zone at the point where the detected user is located while continuing to light the road with a long range beam on either side of the user. The ADB function has many advantages: convenience of use, better visibility compared to lighting in low beam mode, risk of glare greatly reduced, safer driving, etc.

Advantageously, the light beam will be composed of light pixels of small size to enhance its resolution. This makes it possible to further enhance the road lighting convenience.

Notably for cost reasons, it is preferable to produce a beam exhibiting a central zone having a higher resolution than the peripheral zone, that is to say light pixels of smaller size in the axis of the forward-running direction of the vehicle than the light pixels which light at the periphery of the central zone.

The aim is more particularly to obtain light pixels having a very small height in order to allow the lighting of the road above and below a shadow zone. For example, when a user of the road is detected at a great distance in front of the vehicle, for example beyond the range of a low beam, the light beams which light this vehicle are switched off. When the light pixels have a small height, it is possible to continue to light the road to the front as close as possible to this vehicle, beyond the range of a low beam.

Furthermore, a better vertical resolution of the matrix of light pixels in the forward-running axis of the vehicle would allow the lighting device to produce a regulatory cut-off beam function by means of said matrix by switching off the light pixels arranged above the cut-off line. A better vertical resolution would thus make it possible to obtain a more accurate positioning of the horizontal sections of the cut-off line. If the cut-off line also has an oblique section, the latter will be produced more accurately.

In the current state of the art, the reduction of the size of the light pixels is limited, for example to squares extending vertically over an angular field of 1° and transversely over an angular field of 1°. Obtaining smaller light pixels remains technically possible but would incur costs that are too great to allow for the industrialization thereof. Furthermore, the optical efficiency of such a system would be extremely low, for example less than 20%.

BRIEF SUMMARY OF THE INVENTION

The present invention relates to a lighting device for a motor vehicle, the device comprising a first lighting module projecting at least one first matrix of first independently activatable juxtaposed light pixels, the first light pixels being arranged in several vertical columns and in at least one transverse row of determined height, characterized in that it comprises a second lighting module projecting a second matrix of second independently activatable juxtaposed light pixels, the second light pixels being arranged in at least one transverse row, the second matrix being superposed with the first matrix with a vertical offset by a vertical offset distance less than said determined height relative to the first light pixels of the first matrix.

The term "juxtaposed" means that two first vertically or transversely adjacent light pixels are contiguous. That means that when all the light pixels are switched on, the first matrix lights the screen substantially uniformly. Two adjacent light pixels overlap slightly. However when a first light pixel is switched off, a portion of the space that it occupied on the screen is no longer lit by the first matrix.

Such a lighting device makes it possible to obtain a high vertical resolution for a very reasonable production cost, notably by using standard light sources. This device also makes it possible to retain a high light efficiency, for example greater than 30%. The "light efficiency" is defined as being the ratio between the light flux at the output of the lighting device, that is to say that of the light beam, and the incoming light flux, that is to say the sum of the light fluxes from all of the light-emitting diodes.

The higher vertical resolution also makes it possible to reduce the vertical size of the shadow zones around a detected user of the road to guarantee a more comfortable lighting of the road while safeguarding the users of the road from the risks of glare.

Furthermore, producing the lighting function by means of two distinct lighting modules makes it possible to distribute the heat emitted by the light sources over two modules. The cooling of the lighting device is thus facilitated compared to a single lighting module which has to provide a very high light intensity.

According to another aspect of the invention, each second light pixel of the second matrix has the same width as a coinciding first light pixel of the first matrix. This makes it possible to retain a transverse resolution that is at least as good as that of the first matrix taken on its own.

According to another aspect of the invention, the second matrix comprises at least as many rows of light pixels as the first matrix.

The second matrix comprises one row more than the first matrix, the second light pixels of the top end row and of the bottom end row of the second matrix extending vertically outwards beyond the first matrix.

The advantage of this embodiment is that the matrix having a smaller number of rows is less costly to produce, the superpositioning of the two matrices nevertheless making it possible to retain a good vertical resolution.

According to another aspect of the invention, each light pixel of the first matrix and of the second matrix has a height less than 2°.

Furthermore, each light pixel of the first matrix and of the second matrix has a width less than 2°.

The width is defined as being substantially equal to the width at mid-height of the light intensity profile, as is for example described hereinbelow with reference to FIG. 12.

Preferably, but in a nonlimiting manner, the vertical offset distance of the second matrix relative to the first matrix is substantially equal to half the determined height.

This makes it possible to obtain a vertical resolution that is uniform over all the height of the zone lit by the two matrices. The vertical resolution is thus greater than the resolution of a single matrix. The vertical resolution is for example multiplied by a factor strictly greater than 1 that can range up to 2 compared to a single matrix comprising pixels of a height similar to those of just one of the two matrices.

According to another aspect of the invention, the matrices comprise more columns than rows. This makes it possible in particular to light the road over all of its width and over a sufficient range to produce the "ADB" beam function and/or a cut-off beam function. The lit field is thus wider than it is high.

According to another aspect of the invention, the columns of the second matrix are arranged to coincide with the columns of the first matrix. This makes it possible to simplify the method for controlling the light device.

According to another aspect of the invention, the light beam with light pixels is emitted along an axis of emission, the first matrix being centred vertically relative to said axis. This arrangement makes it possible to produce a cut-off line of a beam with cut-off by selectively activating certain pixels of the two matrices.

BRIEF DESCRIPTION OF THE FIGURES

Other features and advantages of the invention will become apparent while reading the following detailed description, for an understanding of which reference will be made to the attached drawings in which:

FIG. 1 is a side view which schematically represents a vehicle equipped with a lighting device produced according to the teachings of the invention;

FIG. 2 is a perspective view which represents two lighting modules of the lighting device of FIG. 1 which each project a matrix of light pixels;

FIG. 3A is a front view of a screen lit only by the first matrix of light pixels projected by the first lighting module;

FIG. 3B is a front view of a screen lit only by the second matrix of light pixels projected by the second lighting module;

FIG. 4 is a front view of the screen lit simultaneously by the two matrices;

FIG. 5 is a detail view of the screen which represents a column of the first matrix and of the second matrix, and in which a first segment is switched off;

FIG. 6 is a detail view of the screen which represents a column of the first matrix and of the second matrix, and in which a top end segment is switched off;

FIG. 7 is a view similar to that of FIG. 4 in which certain light pixels have been switched off to form a beam with cut-off;

FIGS. 8 to 10 are views similar to that of FIG. 4 which represent variant embodiments of the invention in which the number of rows of light pixels of the first matrix and/or of the second matrix vary relative to the embodiment of FIG. 4;

FIG. 11 is a schematic side view which represents the first lighting module of FIG. 2;

DETAILED DESCRIPTION OF THE FIGURES

Figure 12:
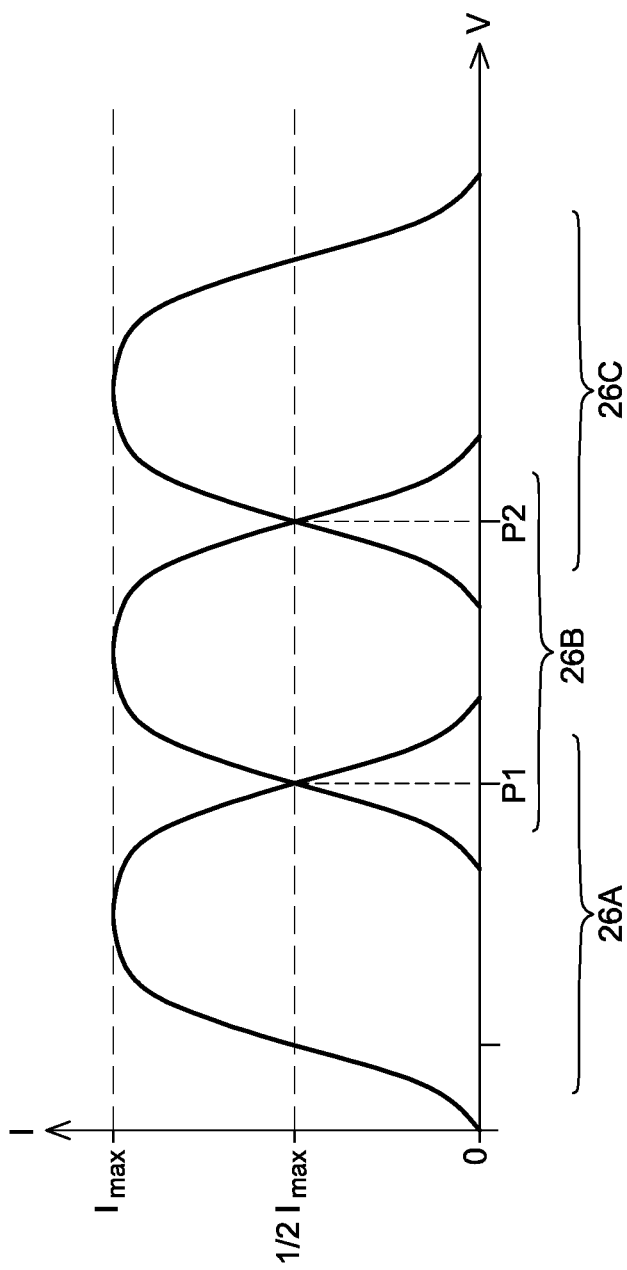
FIG. 12 is a diagram which represents the light intensity of three adjacent pixels of a column of the first matrix along a vertical cutting plane passing through their centre.

Hereinafter in the description, elements that have an identical structure or similar functions will be designated by the same reference.

Hereinafter in the description, orientations that are longitudinal, oriented from back to front in the direction of normal movement of the vehicle, vertical, oriented from bottom to top, and transverse, oriented from left to right, indicated by the "L,V,T" trihedron of the figures, will be adopted in a nonlimiting manner.

FIG. 1 shows a motor vehicle 10 equipped with a lighting device 12 which produces a light beam with light pixels 16 which produces a determined lighting function. Here, it is a high beam function. The light beam with light pixels 16 is emitted along an axis "A" of emission that is substantially longitudinal to the front of the vehicle 10.

For the requirements of the description, a vertical transverse screen 18 has been arranged at a determined longitudinal distance in front of the vehicle 10. The screen 18 is, here, arranged at 25 m from the vehicle.

As is illustrated in FIG. 2, the lighting device 12 comprises at least a first lighting module 20 and a second lighting module 22. Here, the two lighting modules 20, 22 are distinct from one another. Very preferentially, they can be included in one and the same headlight. This arrangement makes it possible to facilitate the setting of the usual alignment of the lighting modules. Furthermore, that simplifies the type approval of the headlight.

As a variant, the two lighting modules can be included in two distinct headlights.

The first lighting 20 is designed to project at least one first matrix 24 of first independently activatable juxtaposed light pixels 26. The zones of the screen 18 which are lit by the first matrix 24 of light pixels 26 has been represented in FIG. 3A. The first matrix 26 is delimited towards the top by a top transverse edge 25 and towards the bottom by a bottom transverse edge 27.

The term "juxtaposed" means that two first vertically or transversely adjacent light pixels 26 are contiguous. That means that when all the light pixels 26 are switched on, the first matrix 24 lights the screen 18 substantially uniformly. To this end, two adjacent light pixels 26 overlap slightly. However, when a first light pixel 26 is switched off, a portion of the space that it occupied on the screen 18 is not lit by the neighbouring pixels. The example represented in FIG. 12 explains the meaning of the expression of "overlaps slightly". FIG. 12 represents the light intensity profiles of three adjacent pixels 26A, 26B, 26C of a same column 28 projected onto the screen 18. Each pixel 26A, 26B, 26C has a bell-shaped intensity profile, the maximum intensity Imax being situated at the centre of the pixel 26A, 26B, 26C. As can be seen, the bottom pixel 26A overlaps the central pixel 26B in such a way that the intensity curves intersect at a point "P1" exhibiting an intensity substantially equal to half the maximum intensity Imax. Similarly, the top pixel 26C overlaps the central pixel 26B in such a way that the intensity curves intersect at a point "P2" exhibiting an intensity substantially equal to half the maximum intensity Imax. A central strip including the top of the bell is lit only by the central pixel 26B and this central strip is surrounded by strips lit in a degraded and less intense manner, which extend from the central strip respectively to the points P1 and P2.

On the screen 18, there are plotted a transverse axis "H" and a vertical axis "V" converging at the axis "A" of emission of the light beam with light pixels 16. The axes "H" and "V" are graduated in degrees of aperture of the light beam. Hereinafter in the description and in the claims, the height and the width of a light pixel are given in degrees of aperture.

The first matrix 24 is arranged in proximity to the axis "H" converging with the axis of emission "A". More particularly, the first matrix 24 is arranged straddling said axis "H". Thus, the first matrix 24 is centred vertically relative to the axis "A".

The first light pixels 26 are arranged in several vertical columns 28. All the light pixels 26 of a same vertical column 28 have a same width. In the example represented in the figures, all the columns 28 here have the same width "Dl".

In a variant of the invention that is not represented, at least one column of light pixels has a width different from the others.

The first light pixels 26 are arranged in at least one transverse row 30. All the light pixels 26 of a same transverse row 30 have the same height. In the examples represented in the figures, all the transverse rows 30 have the same determined height "Dh". The top edge of the top end row 30 forms the top edge 25 of the first matrix 26, whereas the bottom edge of the bottom end row 30 forms the bottom edge 27 of the matrix.

In a variant of the invention that is not represented, at least one transverse row of light pixels has a height that is different from the other rows.

In the example represented in FIG. 3A, the first matrix 24 comprises two rows 30 and several tens of columns 28. The first light pixels 26 forming the first matrix 24 thus have a form and dimensions that are identical. The first matrix 24 more particularly has a number of columns 28 greater than the number of rows 30.

In a nonlimiting manner, the first light pixels 26 here have a square form.

In a variant of the invention that is not represented, the first light pixels 26 have a rectangular form.

Each light pixel 26 of the first matrix 24 has a height "Dh" less than 2°, for example a height "Dh" of 1°. Each light pixel 26 of the first matrix 24 also has a width "Dl" less than 2°, for example a width "Dl" of 1°.

The first matrix 24 extends, for example, transversely over a horizontal field which comprises at least the interval [−30°, +30°], even [−40°, +40°], transversely on either side of the optical axis "A". The first matrix 24 extends, for example, vertically over a vertical field which comprises at most the interval [−3°, +3°] vertically on either side of the optical axis "A".

The first matrix 24 is here extended upwards by a top extension zone 32A and downwards by a bottom extension zone 32B of light pixels 34 with low resolution. The extension zones 32A, 32B only slightly overlap the first light pixels 26 of the first matrix 24. These low resolution light pixels 34 have at least one of their dimensions which is greater than the corresponding one of a first light pixel 26. Here, each low resolution light pixel 34 has a height greater than the height "Dh" of a first light pixel 26. On the other hand, each low resolution light pixel 34 here has the same width as a first light pixel 26. The low resolution light pixels 34 are aligned vertically with each column 28 of the first matrix 24.

It will be understood that the light pixels 34 forming the extension zones 32A, 32B, in particular because of their different dimensions, do not form part of the first matrix 24 within the meaning of the invention.

The second lighting module 22 is designed to project a second matrix 36 of second independently activatable juxtaposed light pixels 38. The second matrix 36 is delimited towards the top by a top edge 39 and towards the bottom by a bottom edge 41. FIG. 3B shows the zones of the screen 18 which are lit by the second matrix 36 of light pixels 38. The second matrix 36 of pixels is intended to be superposed with the first matrix 24 of pixels.

The term "juxtaposed" covers, for the light pixels 38 of the second matrix 36, the same meaning as for the light pixels 26 of the first matrix 24.

Each light pixel 38 of the second matrix 36 has a height "Dh" less than 2°, for example a height "Dh" of 1°. Each light pixel 38 of the second matrix 36 also has a width "Dl" less than 2°, for example a width "Dl" of 1°.

The second light pixels 38 are arranged in several vertical columns 40. All the second light pixels 38 of a same vertical column 40 have a same width. Each vertical column 40 more particularly has the same width as the coinciding column 28 of the first matrix 24. In the example represented in the figures, all the columns 40 here have the same width "Dl".

In a variant of the invention that is not represented, at least one column of light pixels has a different width from the others.

The second matrix 36 is superposed with the first matrix 24 so that each column 40 of the second matrix 36 coincides with an associated column 28 of the first matrix 24. To this end, each column 40 of the second matrix 36 has the same width as the coinciding column 28 of the first matrix 24.

The second light pixels 38 are arranged in at least one transverse row 42. All the second light pixels 38 of a same transverse row 42 have the same height. In the examples represented in the figures, all the transverse rows 42 have the same determined height "Dh".

In a variant of the invention that is not represented, at least one transverse row of light pixels has a different height from the other rows.

In the embodiments represented in the figures, each second light pixel 38 here has the same determined height "Dh" as the first light pixels 26. In the embodiments represented in the figures, each second light pixel 38 of the second matrix 36 has the same width "Dl" as a first light pixel 26 of the first matrix 24. Thus, the light pixels 38 of the second matrix 36 are identical in form and in dimensions to the light pixels 26 of the first matrix 24.

In a variant of the invention that is not represented, the first light pixels 26 have a rectangular form.

The second light pixels 38 are, here, arranged in several vertical columns 40 of the same width "Dl" and in at least one transverse row 42 of determined height "Dh". In the example represented in FIG. 3B, the second matrix 36 comprises two rows 42 and several tens of columns 40.

Preferably, the second matrix 36 comprises at least as many rows 42 of light pixels 38 as the first matrix 24. According to some embodiments which will be detailed hereinbelow, the second matrix 36 comprises one row more than the first matrix 24.

The second matrix 36 here comprises as many columns 40 as the first matrix 24. Since the columns 40 of the second matrix 36 have the same width as the columns 28 of the first matrix 24, the second matrix 36 therefore extends transversely over the same horizontal field as the first matrix 24, that is to say at least over the interval [−30°, +30°], even [−40°, +40°], transversely on either side of the optical axis "A".

In a variant, the second matrix 36 comprises fewer columns 40 than the first matrix 24. The second matrix 36 then extends over a more limited angular field than that of the first matrix 24 and it is centred transversely relative to optical axis "A".

According to yet another variant, the second matrix is offset transversely relative to the optical axis. For example, the matrix is offset to the right.

Moreover, the second matrix 36 here comprises as many rows 42 as the first matrix 24. The second matrix 36 therefore extends vertically over a vertical field of the same angular aperture as that of the first matrix 24, that is to say over a vertical field of approximately 6°.

In a variant, the two matrices have vertical fields having angular apertures of different values, for example if the two matrices do not comprise the same number of rows and/or if the matrices comprise rows of different heights.

The second matrix 36 here has a greater number of columns 40 than of rows 42.

As is illustrated in FIG. 4, the lighting modules 20, 22 are designed for the second matrix 36 to be projected so as to be superposed with the first matrix 24 with a vertical offset by a vertical offset distance "P" less than said height "Dh" of a light pixel 26 relative to the first light pixels 26 of the first matrix 24.

The term "offset" is defined in relation to a "non-offset" position of superposition in which at least the bottom end transverse edge 41 of the second matrix 36 is vertically superposed with the bottom end transverse edge 27 of the first matrix 24.

In the example represented in FIG. 4, the two matrices 24, 36 comprise the same number of rows 30, 42, and the rows 30, 42 have a uniform height. The second matrix 36 is offset downwards by the offset distance "P" relative to the first matrix 24.

The vertical offset distance "P" of the second matrix 36 relative to the first matrix 24 is substantially equal to half the determined height "Dh" of a light pixel 26, 38. Thus, the light pixels 38 of the second matrix 36 vertically overlap the light pixels 26 of the first matrix 24.

In a variant, when the rows of the matrices of pixels have non-uniform heights, the offset distance and the height of the rows are determined in such a way that each bottom and top transverse edge of a pixel of the second matrix is arranged vertically in the middle of a corresponding pixel of the first matrix. For example, the top and/or bottom end rows of at least one of the matrices have heights greater than those of the intermediate rows. That advantageously makes it possible to increase the angular aperture of the vertical field without increasing the number of pixels. This makes it possible to reduce the cost of production of the light module, in particular by limiting the number of light sources.

The zone lit by the two matrices 24, 36 is then subdivided into segments, each of which has the same width "Dl" as a light pixel 26, 38, but only half the height "Dh" of a light pixel 26, 38. Each segment is lit by half a light pixel 26, 38. This offset thus makes it possible to increase the vertical resolution of the zone lit by the two matrices 24, 36.

FIGS. 5 and 6 show in detail a zone of the screen 18 lit by a column 28 of the first matrix 24 and the corresponding column 40 of the second matrix 36. The references of the light pixels 26, 38 of each matrix 24, 36 have been modified to make it possible to accurately identify each light pixel in these figures. Thus, the light pixels of the top rows are respectively referenced 26A, 38A, whereas the light pixels of the bottom rows are referenced 26B, 38B.

Some of these segments are lit simultaneously by an upper or lower half of a light pixel 26 of the first matrix 24 and by a respectively lower or upper half of a light pixel 38 of the second matrix 38. Such is the case of the segment "S" illustrated in FIG. 5. This segment "S" is lit simultaneously by the upper half of the light pixel 26B of the first matrix 24 and by the lower half of the light pixel 38A of the second matrix 36. The segment "S" is thus delimited vertically towards the top by the light pixel 26A of the first matrix 24 and towards the bottom by the light pixel 38B of the second matrix 36. When the light pixels 26B, 38A are switched off, the segment "S" is no longer lit. However, the adjacent segments are likely to remain lit by the light pixels 26A and 38B.

It will be noted that, because of the switching off of light pixels 26B, 38A higher than the segment "S", the segments situated directly above and/or below the segment "S" that is switched off exhibit a reduced light intensity because they are then lit only by a single light pixel 26A or 38B. This makes it possible to obtain a progressive reduction of the brightness in proximity to the segment "S" that is switched off, thus obtaining a better lighting comfort for the driver.

In the example represented in FIG. 6, the segment "S" arranged at the top end of the lit zone is lit only by an upper half of the light pixel 26A of the top row 30 of the first matrix 24. In this case, it is only necessary to switch off the corresponding light pixel 26A of the first matrix 24 to no longer light said segment "S". The segment arranged below said segment that is not lit is then likely to be lit by the upper half of the light pixel 38A of the second matrix 36.

The lighting device 12 produced according to the teachings of the invention also makes it possible to produce a light function with oblique cut-off, for example a low beam function. As illustrated in FIG. 7, in this type of light, the zone lit by the beam is delimited towards the top by a substantially transverse cut-off line 44. The cut-off line 44 exhibits a shoulder 44B which extends advantageously at an angle of approximately 45° between two lower 44A and upper 44C transverse portions of the cut-off line 44. This shoulder 44B is arranged in proximity to the optical axis "A".

To produce such a function, the top zone of extension 32A of the first matrix 24 is switched off, as are the two top rows 30, 42 of each matrix 24, 36. For the bottom row 30 of the first matrix 24, the light pixels 26 situated on the side of the upper transverse portion 44C of the cut-off line 44 remain switched on, whereas the light pixels 26 situated on the side of the lower transverse portion 44A of the cut-off line 44 are switched off.

Similarly, for the bottom row 42 of the second matrix 36, the light pixels 38 situated on the side of the upper transverse portion 44C of the cut-off line 44 remain switched on, whereas the light pixels 38 situated on the side of the lower transverse portion 44A of the cut-off line are switched off. In this way, the lower portion 44A of the cut-off line 44 is formed by the top limit of the bottom extension zone 32B, and the upper transverse portion 44C is thus formed by the top edges of the light pixels 26 that are switched on of the first matrix 24.

A so-called shoulder light pixel 38E, of the second matrix 36, remains switched on in the first column from which the light pixels 26 of the first matrix 24 are switched off, in the zone of the shoulder 44B. The shoulder 44B is thus formed by the staircase produced by the shoulder light pixel 38E. In this way, it is possible to obtain a beam with cut-off exhibiting a progressive shoulder by using only the matrices 24, 36.

FIGS. 8 to 10 show variant embodiments of the invention. In all these variants, the vertical offset distance "P" of the second matrix 36 relative to the first matrix 24 is substantially equal to half the determined height "Dh" of a light pixel 26, 38.

In the variant represented in FIG. 8, the first matrix 24 comprises a single row 30 of light pixels 26 and the second matrix 36 comprises a single row 42 of light pixels 38. The row 42 of the second matrix 36 is offset downwards by the offset distance "P".

Thus, only the lower half of the light pixels 26 of the first matrix 24 is overlapped by the upper half of the light pixels 38 of the second matrix 36. In this configuration, it is possible to switch off a segment lit by the upper half of a light pixel 26 of the first matrix 24 while leaving the segment arranged below lit by the upper half of the corresponding light pixel 38 of the second matrix 36.

Nevertheless, to switch off the segment lit simultaneously by a light pixel 26, 38 of each matrix 24, 36, it is also necessary to simultaneously switch off the segment lit only by said light pixel 26 situated directly above.

This variant is however perfectly suitable for producing a beam with cut-off as illustrated in FIG. 7.

In the variant represented in FIG. 9, the first matrix 24 is identical to that of the variant of FIG. 8. On the other hand, the second matrix 36 here has one row more than the first matrix 24, i.e. two rows 42. The second light pixels 38 of the top row and the bottom row of the second matrix 36 extend vertically outward beyond the first matrix 24.

Thus, the upper half of a light pixel 26 of the first matrix 24 is superposed with a lower half of a light pixel 38 of the top row of the second matrix 36, whereas the lower half of a light pixel 26 of the first matrix 24 is superposed with an upper half of a light pixel 38 of the bottom row of the second matrix 36.

Unlike the variant of FIG. 8, the addition of this top row 42 of the second matrix 36 now makes it possible to independently switch off a top segment or a bottom segment lit by the first matrix 24.

In the variant of FIG. 10, the first matrix 24 comprises two rows 30 as in the embodiment of FIG. 4. On the other hand, the second matrix 36 here has one row more than the first matrix 24, i.e. three rows 42. The second light pixels 38 of the top row and of the bottom row of the second matrix 36 extend vertically outward beyond the first matrix 24.

This variant operates like that of FIG. 9, except that the zone lit by the matrices 24, 36 extends vertically over a greater angular field.

Obviously, all these variants make it possible to produce a beam with oblique cut-off function as is described with reference to FIG. 7.

An exemplary embodiment of the first lighting module 20 is represented in FIG. 11. The description is applicable to the second lighting module 22.

Each light pixel 26 of the first matrix 24 is produced by light sources and associated optical elements. The lighting module 20 comprises at least one matrix 45 of light-emitting diodes 46 extending orthogonally to the optical axis "A". The light-emitting diodes 46 of the matrix 45 are capable of being individually controlled or are capable of being individually controlled in groups.

The light-emitting diodes 46 of the matrix 45 have light emission surfaces which are all identical in form and in dimension. All the light-emitting diodes 46 are here borne by a common printed circuit board 47.

The lighting module 20 also comprises at least one primary optical element 48. The primary optical element 48 is designed to distribute the light according to a determined distribution in the associated light pixel 26. The primary optical element 48 here comprises light guides 50. Each light-emitting diode 44 is individually associated with a light guide 50. Each light guide 50 has an input face 52 receiving light rays emitted by the associated light source 46. An output face 54 of each light guide 50 is arranged substantially in a same vertical transverse plane. The lighting module 20 further comprises a secondary projection optical element 56 which makes it possible to project the output of each light guide to form the first matrix 24.

In a variant not represented, microlenses are arranged at the input and/or at the output of the light guides.

According to another variant not represented, the light-emitting diodes are directly imaged by the projection lens without the interposition of light guides.

In a variant of the invention that is not represented, provision is made to equip a vehicle with two lighting devices each comprising a first and a second matrices of pixels superposed according to the teachings of the invention. In one of the devices, the second matrix is offset transversely to the left relative to the axis of emission "A", whereas, in the other of the devices, the second matrix is offset to the right. The two pixel light beams emitted by these two devices are then superposed in such a way that the four matrices are superposed at the centre of the light beam with a vertical offset relative to one another. Thus, on the left and right sides of the beam, the increase in resolution is obtained by the superposition of two matrices, as explained previously, whereas, at the centre of the beam, the vertical resolution is even finer, because it is obtained by the superposition of four matrices.

The invention claimed is:

1. Lighting device for a motor vehicle producing a determined lighting function, the device comprising a first lighting module projecting at least one first matrix of first independently activatable juxtaposed light pixels, the first light pixels being arranged in several vertical columns and in at least one transverse row of determined height (Dh),
    wherein the lighting device comprises a second lighting module projecting a second matrix of second independently activatable juxtaposed light pixels, the second light pixels being arranged in at least one transverse row, the second matrix being superposed with the first matrix with a vertical offset by a vertical offset distance (P) less than said determined height (Dh) relative to the first light pixels of the first matrix, wherein the second matrix comprises one row more than the first matrix.

2. Lighting device according to claim 1, wherein each second light pixel of the second matrix has the same width (Dl) as a coinciding first light pixel of the first matrix.

3. Lighting device according to claim 2, wherein the second matrix comprises at least as many rows of light pixels as the first matrix.

4. Lighting device according to claim 2, wherein each light pixel of the first matrix and of the second matrix has an angular height of less than 2° relative to an optical axis of emission of the light device.

5. Lighting device according to claim 2, wherein the vertical offset distance (P) of the second matrix relative to the first matrix is substantially equal to half the determined height (Dh).

6. Lighting device according to claim 1, wherein each light pixel of the first matrix and of the second matrix has an angular height of less than 2° relative to an optical axis of emission of the light device.

7. Lighting device according to claim 6, wherein each light pixel of the first matrix and of the second matrix has an angular height of less than 2° relative to an optical axis of emission of the light device.

8. Lighting device according to claim 1, wherein the vertical offset distance (P) of the second matrix relative to the first matrix is substantially equal to half the determined height (Dh).

9. Lighting device according to claim 1, wherein the matrices comprise more columns than rows.

10. Lighting device according to claim 1, wherein the columns of the second matrix are arranged to coincide with the columns of the first matrix.

11. Lighting device according to claim 1, wherein the light beam with light pixels is emitted along an axis (A) of emission, the first matrix is centred vertically relative to said axis (A).

12. Lighting device according to claim 1, wherein each light pixel of the first matrix and of the second matrix has a width less than 2°.

13. Lighting device for a motor vehicle producing a determined lighting function, the device comprising a first lighting module projecting at least one first matrix of first independently activatable juxtaposed light pixels, the first light pixels being arranged in several vertical columns and in at least one transverse row of determined height (Dh), wherein the lighting device comprises a second lighting module projecting a second matrix of second independently activatable juxtaposed light pixels, the second light pixels being arranged in at least one transverse row, the second matrix being superposed with the first matrix with a vertical offset by a vertical offset distance (P) less than said determined height (Dh) relative to the first light pixels of the first matrix, wherein the second matrix comprises one row more than the first matrix, the second light pixels of the top end row and of the bottom end row of the second matrix extending vertically outwards beyond the first matrix.

14. Lighting device according to claim 13, wherein each light pixel of the first matrix and of the second matrix has an angular height of less than 2° relative to an optical axis of emission of the light device.

* * * * *